United States Patent
Fulmer et al.

(10) Patent No.: US 7,681,962 B2
(45) Date of Patent: Mar. 23, 2010

(54) METHOD FOR ESTIMATING MASTER CYLINDER PRESSURE DURING BRAKE APPLY

(76) Inventors: Bryan Todd Fulmer, 15292 Murray Rd., Byron, MI (US) 48418; Deron C. Littlejohn, 6246 Kiev St., West Bloomfield, MI (US) 48324; Rebecca L Wang, 20711 NE. Puget St., Indianola, WA (US) 98342

( * ) Notice: Subject to any disclaimer, the term of this patent is extended or adjusted under 35 U.S.C. 154(b) by 516 days.

(21) Appl. No.: 11/789,942

(22) Filed: Apr. 26, 2007

(65) Prior Publication Data
US 2008/0265664 A1    Oct. 30, 2008

(51) Int. Cl.
*B60T 8/60* (2006.01)
*B60T 8/32* (2006.01)

(52) U.S. Cl. .................. 303/155; 303/167; 303/183; 303/113.4; 303/DIG. 2

(58) Field of Classification Search .............. 303/113.4, 303/155, 167, 168, 177, 178, 183, DIG. 1, 303/DIG. 2
See application file for complete search history.

(56) References Cited

U.S. PATENT DOCUMENTS

| 5,551,770 A * | 9/1996 | Hrovat et al. | 303/167 |
| 5,967,624 A * | 10/1999 | Graber et al. | 303/113.4 |
| 7,066,559 B2 * | 6/2006 | Imamura | 303/140 |

* cited by examiner

*Primary Examiner*—Thomas J Williams
(74) *Attorney, Agent, or Firm*—Dickinson Wright PLLC

(57) ABSTRACT

A method for estimating master cylinder pressure during brake apply of a brake system of a vehicle, wherein the brake system includes a brake pedal. A first master cylinder pressure is estimated from brake pedal position during brake apply. A second master cylinder pressure is estimated from vehicle deceleration during brake apply. The master cylinder pressure is estimated during brake apply to be equal to the first master cylinder pressure when the vehicle deceleration is below a predetermined deceleration value. The master cylinder pressure is estimated during brake apply to be equal to a value which is less than the first master cylinder pressure and greater than or equal to the second master cylinder pressure when the vehicle deceleration is at or above the predetermined deceleration value. At least the estimated master cylinder pressure during brake apply is used to control the vehicle.

20 Claims, 3 Drawing Sheets

METHOD FOR ESTIMATING MASTER CYLINDER PRESSURE DURING BRAKE APPLY

TECHNICAL FIELD

The present invention relates generally to braking systems, and more particularly to a method for estimating master cylinder pressure during brake apply.

BACKGROUND OF THE INVENTION

Conventional vehicle braking systems include those having a brake pedal operatively connected (with or without a booster) to a brake apply master cylinder. Vehicles are known which employ a master cylinder pressure sensor to measure master cylinder pressure. In some vehicles, the measured master cylinder pressure is used by the vehicle's electronic control unit (ECU) as an input to an electronic stability control (ESC) system of the vehicle. Vehicles are known which employ a brake pedal travel sensor to measure brake pedal travel. In some vehicles, the measured brake pedal travel is used by the ECU as an input to an anti-lock braking system (ABS) of the vehicle.

What is needed is an improved method for estimating master cylinder pressure during brake apply of a brake system of a vehicle.

SUMMARY OF THE INVENTION

A first method of the invention is for estimating master cylinder pressure during brake apply for a brake system of a vehicle, wherein the brake system includes a brake pedal. The first method includes steps a) through e). Step a) includes determining a first master cylinder pressure from brake pedal position during brake apply. Step b) includes determining a second master cylinder pressure from vehicle deceleration during brake apply. Step c) includes estimating the master cylinder pressure during brake apply to be equal to the first master cylinder pressure when the vehicle deceleration is below a predetermined deceleration value. Step d) includes estimating the master cylinder pressure during brake apply to be equal to a value which is less than the first master cylinder pressure and greater than or equal to the second master cylinder pressure when the vehicle deceleration is at or above the predetermined deceleration value. Step e) includes using at least the estimated master cylinder pressure during brake apply to control the vehicle.

A second method of the invention is for estimating master cylinder pressure during brake apply for a brake system of a vehicle, wherein the brake system includes a brake pedal. The second method includes steps a) through f). Step a) includes determining a first master cylinder pressure from brake pedal position during brake apply. Step b) includes determining a second master cylinder pressure from vehicle deceleration during brake apply. Step c) includes estimating the master cylinder pressure during brake apply to be equal to the first master cylinder pressure when the vehicle deceleration is below a predetermined deceleration value. Step d) includes calculating an error to be equal to the first master cylinder pressure minus the second master cylinder pressure when the vehicle deceleration is at or above the predetermined deceleration value. Step e) includes estimating the master cylinder pressure during brake apply to be equal to the first master cylinder pressure minus a value of a variable percentage of the error when the vehicle deceleration is at or above the predetermined deceleration value, wherein the value of the variable percentage is adaptively learned over time. Step f) includes using at least the estimated master cylinder pressure during brake apply to control the vehicle.

Several benefits and advantages are derived from one or more of the methods of the invention. In one example, estimating master cylinder pressure from brake pedal position and vehicle deceleration eliminates the need for a relatively expensive master cylinder pressure sensor, as can be appreciated by those skilled in the art.

DETAILED DESCRIPTION

Figure 1:
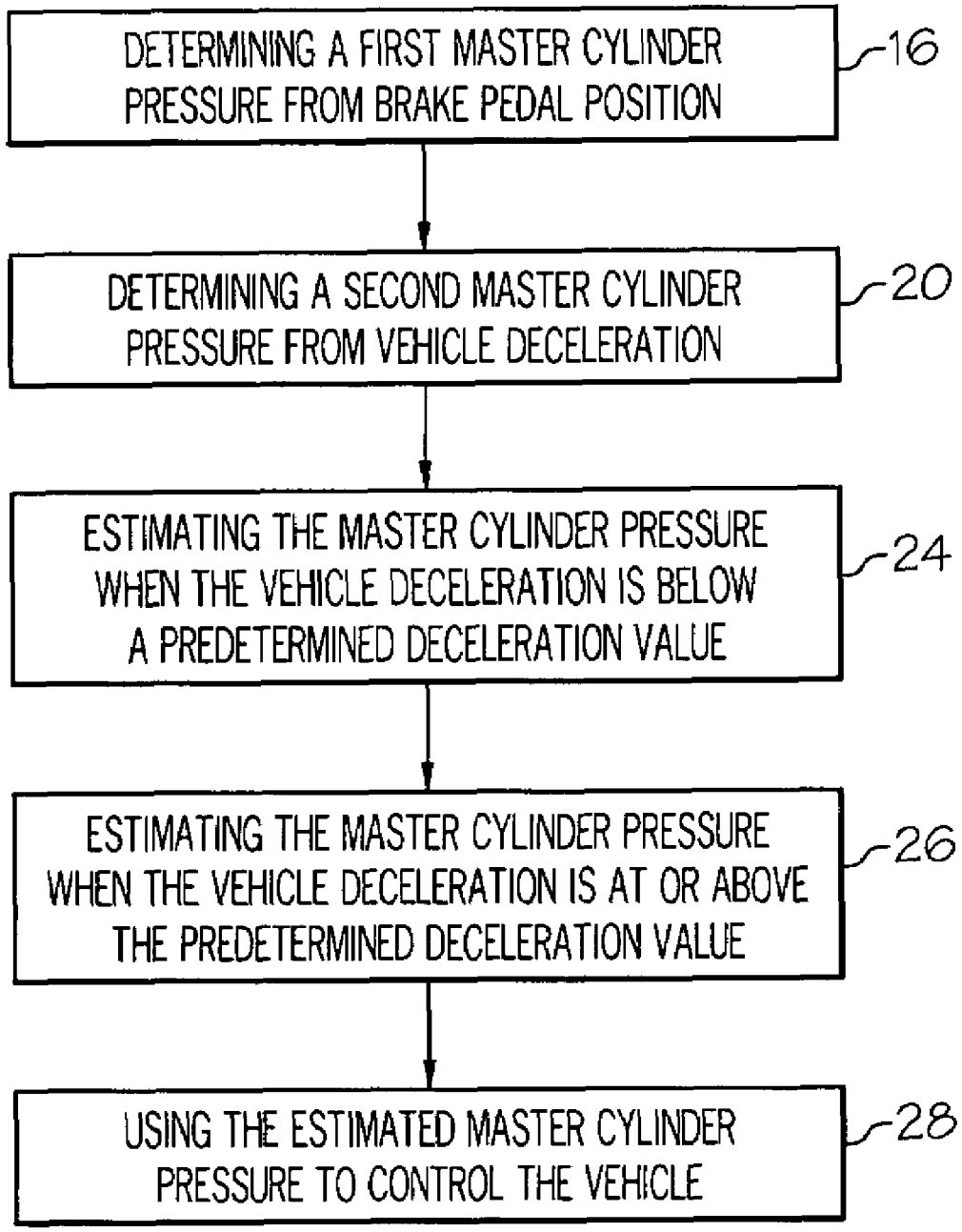
FIG. 1 is a flow chart of one example of a first method of the invention for estimating master cylinder pressure during brake apply of a brake system of a vehicle.
Figure 3:
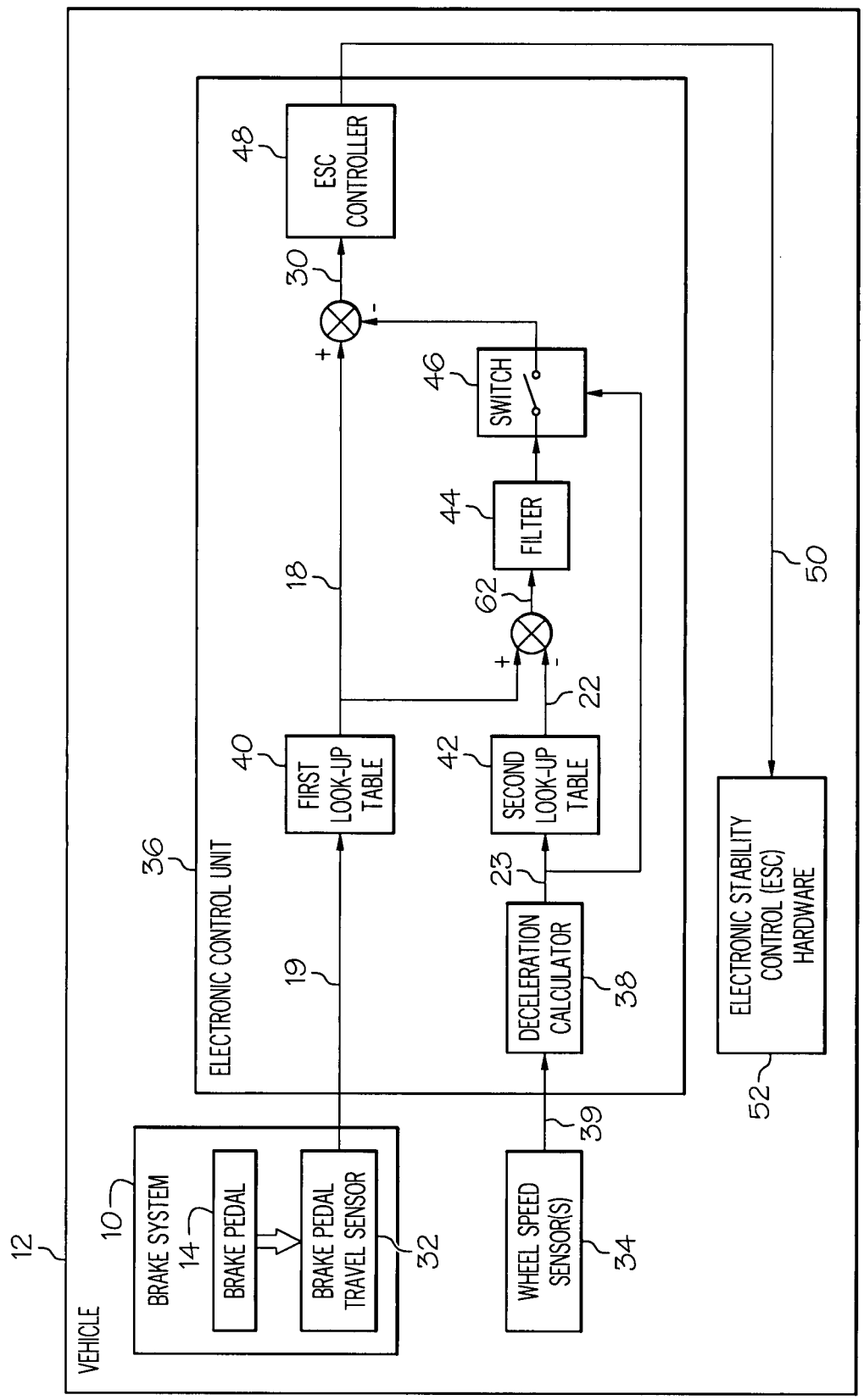
FIG. 3 is a block diagram of an example of a vehicle whose electronic control unit (ECU) receives an input from a brake pedal travel sensor of the vehicle brake system and an input from at least one wheel speed sensor to implement the examples of the methods of FIGS. 1 and 2 depending on the details of the ECU filter used and which outputs an estimated master cylinder pressure to the electronic stability control system (ESC) controller of the vehicle.

Referring to FIGS. 1 and 3, a first method of the invention is for estimating master cylinder pressure during brake apply of a brake system 10 of a vehicle 12, wherein the brake system 10 includes a brake pedal 14. The first method includes steps a) through e). Step a) is labeled as "Determining a First Master Cylinder Pressure from Brake Pedal Position" in block 16 of FIG. 1. Step a) includes determining a first master cylinder pressure 18 from brake pedal position 19 (also called brake pedal travel) during brake apply. Step b) is labeled as "Determining a Second Master Cylinder Pressure from Vehicle Deceleration" in block 20 of FIG. 1. Step b) includes determining a second master cylinder pressure 22 from vehicle deceleration 23 during brake apply. Step c) is labeled in block 24 of FIG. 1 and includes estimating the master cylinder pressure during brake apply to be equal to the first master cylinder pressure 18 when the vehicle deceleration 23 is below a predetermined deceleration value. Step d) is labeled in block 26 of FIG. 1 and includes estimating the master cylinder pressure during brake apply to be equal to a value which is less than the first master cylinder pressure 18 and greater than or equal to the second master cylinder pressure 22 when the vehicle deceleration 23 is at or above the predetermined deceleration value. Step e) is labeled in block 28 of FIG. 1 and includes using the estimated master cylinder pressure 30 during brake apply to control the vehicle 12.

In one enablement of the first method, step a) determines brake pedal position, at least in part, from a brake pedal travel sensor 32. In one variation, step b) determines vehicle deceleration, at least in part, from at least one wheel speed sensor 34. In one implementation, the vehicle 12 includes an electronic control unit (ECU) 36 having a deceleration calculator 38 such as, in one example, software relating a decrease in the wheel rotational speed 39, measured by the at least one wheel speed sensor 34, to vehicle deceleration 23, as is known to those skilled in the art. In a different implementation, a stable platform having gyroscopes and accelerometers (such as used in inertial navigation systems) is used to calculate vehicle acceleration. Other implementations are left to the artisan.

In one employment of the first method, step a) includes using an empirically-determined first look-up table 40 of stored master cylinder pressure values and corresponding stored brake pedal position values. In one variation, step a) includes interpolating a master cylinder pressure value for a brake pedal position value between two closest stored brake pedal position values. In the same or a different employment, step b) includes using an empirically-determined second look-up table 42 of stored master cylinder pressure values and corresponding stored vehicle deceleration values. In one variation, step b) includes interpolating a master cylinder pressure value for a vehicle deceleration value between two closest stored vehicle deceleration values.

In one technique, brake apply experiments are conducted on an as-built test vehicle of a particular model, wherein such test vehicle is equipped with a master cylinder pressure sensor as well as a brake pedal travel sensor 32 and at least one wheel speed sensor 34 to empirically determine values to be stored in the first and second look-up tables 40 and 42. Then, the first method is implemented in another vehicle of the same model which does not have a master cylinder pressure sensor. In another technique, computer simulation runs are conducted on an engineering model having brake pedal position and vehicle deceleration inputs and accounting for appropriate vehicle components to determine values to be stored in the first and second look-up tables 36 and 38.

In a different employment, such engineering model is part of a sophisticated electronic control unit onboard the vehicle and runs in real time to determine the first and second master cylinder pressures 18 and 22. Other employments are left to the artisan.

In one application of the first method, the predetermined deceleration value is equal to substantially 0.2 g, wherein g is gravitational acceleration (which is approximately 32 ft/sec$^2$). It is noted that the determination of the first master cylinder pressure 18 from brake pedal position 19 changes over time for the same brake pedal position value due to an increase in brake compliance which will cause a falsely higher estimated master brake cylinder pressure 30.

In one example, steps b) and d) are used to adjust the estimated master brake cylinder pressure 30 for the effect of such increase in brake compliance and for the effects of changes in other parameters (such as vehicle mass, brake pad/lining friction output, component and ambient temperature, and brake system vacuum). However, no adjustment is made when the vehicle deceleration is below the predetermined deceleration value [i.e., step c) is performed instead of step d)] where, for example, the gravitational effect of a hill (a typical worst case being 0.2 g) slowing down a vehicle contributes significantly to the overall vehicle deceleration (as can occur for a vehicle going uphill).

In one embodiment, steps b), c) and d) are implemented by having the ECU 36 include a filter 44 and a switch 46 as seen in FIG. 3. The switch 46 is open when the vehicle deceleration 23 is below the predetermined deceleration value and is closed when the vehicle deceleration 23 is at or above the predetermined deceleration value.

In a first arrangement, step d) estimates the master cylinder pressure during brake apply to be equal to the second master cylinder pressure 22 when the vehicle deceleration is at or above the predetermined deceleration value. In one illustration, step d) is implemented by having the filter 44 have a transfer function equal to unity.

In a second arrangement, step d) estimates the master cylinder pressure during brake apply to be equal to the first master cylinder pressure 18 minus a fixed percentage of the second master cylinder pressure 22 when the vehicle deceleration is at or above the predetermined deceleration value, wherein the percentage is between 1% and 99%. In one illustration, step d) is implemented by having the filter 44 be programmed or configured accordingly.

In one utilization of the first method, step e) includes sending an input signal based on the estimated master cylinder pressure 30 to an electronic stability control system 48 and 52 of the vehicle 12. In one illustration, step e) is implemented by having the ECU 36 include an electronic stability control system (ESC) controller 48, wherein the estimated master cylinder pressure 30 is an input to the ESC controller 48, and wherein an output from the ESC controller 48 is sent as an input signal 50 to ESC hardware 52 of the vehicle 12. Other examples of vehicle control systems which can receive the estimated master cylinder pressure 30 as an input include, without limitation, ABS (anti-lock braking system), TCS (traction control system), PBA (predictive brake assist) and ACC (adaptive cruise control).

Figure 2:
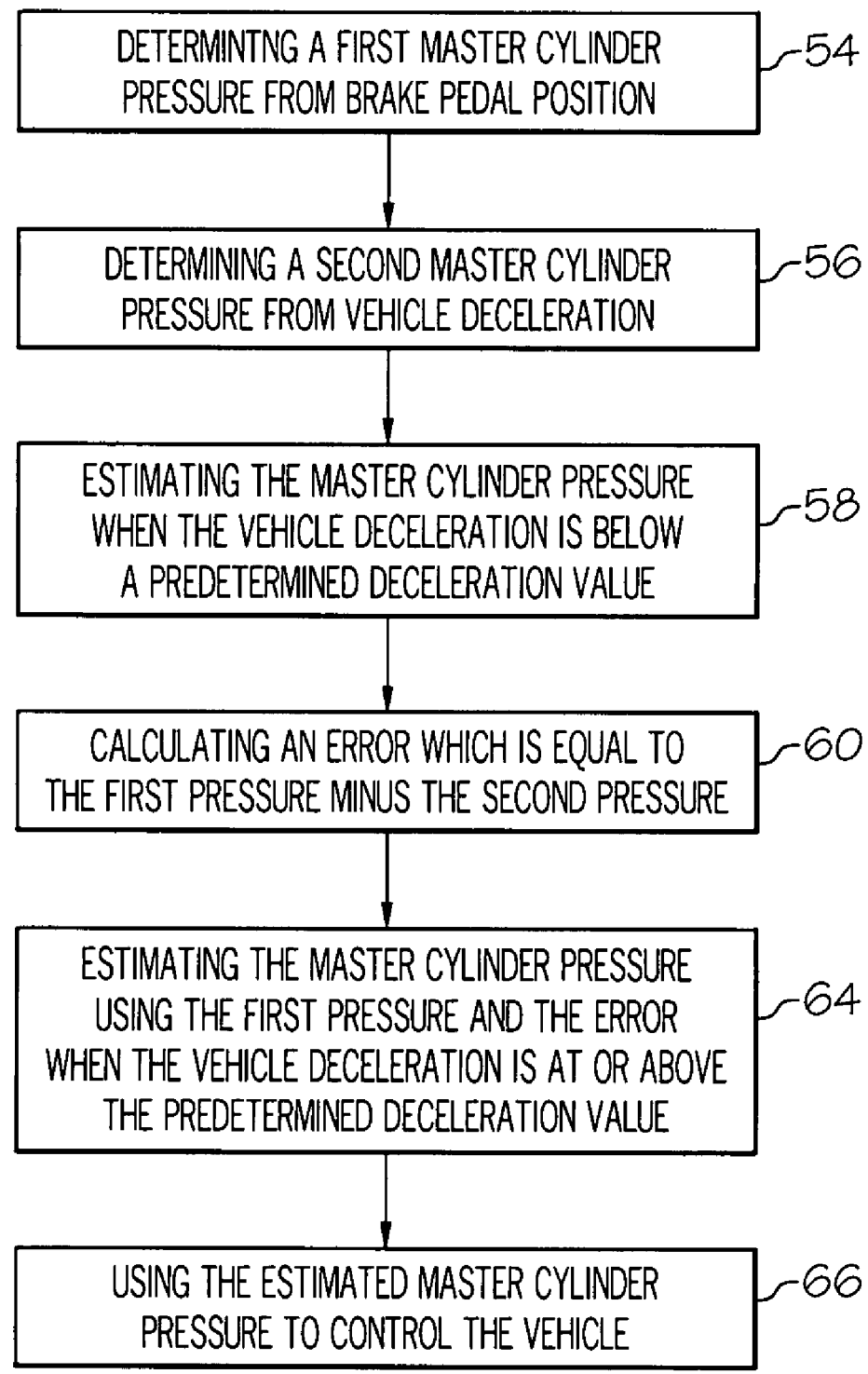
FIG. 2 is a flow chart of one example of a second method of the invention for estimating master cylinder pressure during brake apply of a brake system of a vehicle.

A second method of the invention is for estimating master cylinder pressure during brake apply of a brake system 10 of a vehicle 12, wherein the brake system 10 includes a brake pedal 14. The second method includes steps a) through f). Step a) is labeled as "Determining a First Master Cylinder Pressure from Brake Pedal Position" in block 54 of FIG. 2. Step a) includes determining a first master cylinder pressure 18 from brake pedal position 19 during brake apply. Step b) is labeled as "Determining a Second Master Cylinder Pressure from Vehicle Deceleration" in block 56 of FIG. 2. Step b) includes determining a second master cylinder pressure 22 from vehicle deceleration 23 during brake apply. Step c) is labeled in block 58 of FIG. 2 and includes estimating the master cylinder pressure during brake apply to be equal to the first master cylinder pressure 18 when the vehicle deceleration 23 is below a predetermined deceleration value. Step d) is labeled in block 60 of FIG. 2 and includes calculating an error 62 to be equal to the first master cylinder pressure 18 minus the second master cylinder pressure 22 when the vehicle deceleration 23 is at or above the predetermined deceleration value. Step e) is labeled in block 64 of FIG. 2 and includes estimating the master cylinder pressure during brake apply to be equal to the first master cylinder pressure 18 minus a value of a variable percentage of the error 62 when the vehicle deceleration 23 is at or above the predetermined deceleration value, wherein the value of the variable percentage is adaptively learned over time. Step f) is labeled in block 66 of FIG. 2 and includes using at least the estimated master cylinder pressure 30 during brake apply to control the vehicle 12.

It is noted that the enablements, employments, applications, embodiments, and utilizations of the first method are equally applicable to the second method.

In one illustration of the second method, step d) is implemented by having the filter 44 be programmed or configured to adaptively learn the value of the variable percentage. Adaptive learning is well known in the art. In one technique employing the second method, the filter 44 and switch 46 and the unlabeled summation following the switch 46 in FIG. 3 serve to bound the estimated master cylinder pressure 30 between an upper bound equal to the first master cylinder pressure 18 and a lower bound equal to the second master cylinder pressure 22. In one example, when the switch 46 is closed, the filter 44 adaptively learns a value (using an arbitrary initial value) of the variable percentage which best accounts for vehicle operating parameters over an ignition cycle and uses the value at the end of that ignition cycle as a starting value for the beginning of the next ignition cycle.

Several benefits and advantages are derived from one or more of the methods of the invention. In one example, estimating master cylinder pressure from brake pedal position and vehicle deceleration eliminates the need for a relatively expensive master cylinder pressure sensor, as can be appreciated by those skilled in the art.

The foregoing description of several methods of the invention has been presented for purposes of illustration. It is not intended to be exhaustive or to limit the invention to the precise steps disclosed, and obviously many modifications and variations are possible in light of the above teaching. It is intended that the scope of the invention be defined by the claims appended hereto.

The invention claimed is:

1. A method for estimating master cylinder pressure during brake apply of a brake system of a vehicle, wherein the brake system includes a brake pedal, and wherein the method comprises:
   a) determining a first master cylinder pressure from brake pedal position during brake apply;
   b) determining a second master cylinder pressure from vehicle deceleration during brake apply;
   c) estimating the master cylinder pressure during brake apply to be equal to the first master cylinder pressure when the vehicle deceleration is below a predetermined deceleration value;
   d) estimating the master cylinder pressure during brake apply to be equal to a value which is less than the first master cylinder pressure and greater than or equal to the second master cylinder pressure when the vehicle deceleration is at or above the predetermined deceleration value; and
   e) using at least the estimated master cylinder pressure during brake apply to control the vehicle.

2. The method of claim 1, wherein step a) determines brake pedal position, at least in part, from a brake pedal travel sensor.

3. The method of claim 2, wherein step b) determines vehicle deceleration, at least in part, from at least one wheel speed sensor.

4. The method of claim 3, wherein step a) includes using an empirically-determined first look-up table of stored master cylinder pressure values and corresponding stored brake pedal position values.

5. The method of claim 4, wherein step b) includes using an empirically-determined second look-up table of stored master cylinder pressure values and corresponding stored vehicle deceleration values.

6. The method of claim 5, wherein step a) includes interpolating a master cylinder pressure value for a brake pedal position value between two closest stored brake pedal position values.

7. The method of claim 6, wherein step b) includes interpolating a master cylinder pressure value for a vehicle deceleration value between two closest stored vehicle deceleration values.

8. The method of claim 1, wherein the predetermined deceleration value is equal to substantially 0.2 g, wherein g is gravitational acceleration.

9. The method of claim 1, wherein step d) estimates the master cylinder pressure during brake apply to be equal to the second master cylinder pressure when the vehicle deceleration is at or above the predetermined deceleration value.

10. The method of claim 1, wherein step d) estimates the master cylinder pressure during brake apply to be equal to the first master cylinder pressure minus a fixed percentage of the second master cylinder pressure when the vehicle deceleration is at or above the predetermined deceleration value, wherein the percentage is between 1% and 99%.

11. The method of claim 1, wherein step e) includes sending an input signal based on the estimated master cylinder pressure to an electronic stability control system of the vehicle.

12. A method for estimating master cylinder pressure during brake apply of a brake system of a vehicle, wherein the brake system includes a brake pedal, and wherein the method comprises:
   a) determining a first master cylinder pressure from brake pedal position during brake apply;
   b) determining a second master cylinder pressure from vehicle deceleration during brake apply;
   c) estimating the master cylinder pressure during brake apply to be equal to the first master cylinder pressure when the vehicle deceleration is below a predetermined deceleration value;
   d) calculating an error to be equal to the first master cylinder pressure minus the second master cylinder pressure when the vehicle deceleration is at or above the predetermined deceleration value;
   e) estimating the master cylinder pressure during brake apply to be equal to the first master cylinder pressure minus a value of a variable percentage of the error when the vehicle deceleration is at or above the predetermined deceleration value, wherein the value of the variable percentage is adaptively learned over time; and
   f) using at least the estimated master cylinder pressure during brake apply to control the vehicle.

13. The method of claim 12, wherein step a) determines brake pedal position, at least in part, from a brake pedal travel sensor.

14. The method of claim 13, wherein step b) determines vehicle deceleration, at least in part, from at least one wheel speed sensor.

15. The method of claim 14, wherein step a) includes using an empirically-determined first look-up table of stored master cylinder pressure values and corresponding stored brake pedal position values.

16. The method of claim 15, wherein step b) includes using an empirically-determined second look-up table of stored master cylinder pressure values and corresponding stored vehicle deceleration values.

17. The method of claim 16, wherein step a) includes interpolating a master cylinder pressure value for a brake pedal position value between two closest stored brake pedal position values.

18. The method of claim 17, wherein step b) includes interpolating a master cylinder pressure value for a vehicle deceleration value between two closest stored vehicle deceleration values.

19. The method of claim 12, wherein the predetermined deceleration value is equal to substantially 0.2 g, wherein g is gravitational acceleration.

20. The method of claim 12, wherein step f) includes sending an input signal based on the estimated master cylinder pressure to an electronic stability control system of the vehicle.

* * * * *